US012008901B2

(12) United States Patent
Ji

(10) Patent No.: US 12,008,901 B2
(45) Date of Patent: Jun. 11, 2024

(54) TRANSPORTATION SYSTEM AND OPERATION METHOD THEREOF

(71) Applicant: HYUNDAI MOBIS CO., LTD., Seoul (KR)

(72) Inventor: Yong Kwan Ji, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 108 days.

(21) Appl. No.: 17/467,993

(22) Filed: Sep. 7, 2021

(65) Prior Publication Data

US 2022/0114892 A1 Apr. 14, 2022

(30) Foreign Application Priority Data

Oct. 8, 2020 (KR) .................. 10-2020-0130250

(51) Int. Cl.
G08G 1/127 (2006.01)
G06Q 10/0631 (2023.01)
G08G 5/00 (2006.01)
H04L 67/12 (2022.01)

(52) U.S. Cl.
CPC ....... *G08G 1/127* (2013.01); *G06Q 10/06315* (2013.01); *G08G 5/0043* (2013.01); *G08G 5/0095* (2013.01); *H04L 67/12* (2013.01)

(58) Field of Classification Search
CPC .... G08G 1/127; G08G 5/0043; G08G 5/0095; G06Q 10/06315; H04L 67/12
See application file for complete search history.

(56) References Cited

U.S. PATENT DOCUMENTS

| 6,317,720 | B1 * | 11/2001 | Murakami | ............. G06Q 10/02 705/13 |
| 6,453,298 | B2 * | 9/2002 | Murakami | ......... G06Q 30/0202 705/13 |
| 9,234,765 | B1 | 1/2016 | Padovitz et al. | |
| 2007/0282520 | A1 | 12/2007 | Cradick et al. | |
| 2011/0059693 | A1 * | 3/2011 | O'Sullivan | ............ G06Q 10/00 455/41.1 |
| 2011/0218834 | A1 * | 9/2011 | Boss | ................ G06Q 10/06316 701/532 |
| 2012/0251276 | A1 | 10/2012 | Rathbun et al. | |

(Continued)

FOREIGN PATENT DOCUMENTS

| CN | 111639854 B * | 10/2023 | ........... G06K 9/6256 |
| KR | 10-2018-0003831 A | 1/2018 | |
| WO | WO-2018087811 A1 * | 5/2018 | .............. B61L 27/00 |

OTHER PUBLICATIONS

Ady Milman, "Overtourism Tourism Management and Solutions", 2020, Routledge, Chapter 8 "Visitor management in highly-visited attractions", 33 pages (Year: 2020).*

(Continued)

*Primary Examiner* — Dale W Hilgendorf
(74) *Attorney, Agent, or Firm* — NSIP Law

(57) ABSTRACT

A transportation system including a plurality of hubs, each of the hubs corresponding to an area and including a plurality of connection slots or one or more landing pads, each of the connection slots and the landing pads accommodating a transportation unit; and a server to determine a number or type of transportations units to be allocated to each of the hubs based on movement data related to population movement between the areas and to allocate each of the transportation units to a respective hub.

15 Claims, 4 Drawing Sheets

(56) References Cited

U.S. PATENT DOCUMENTS

| | | | |
|---|---|---|---|
| 2012/0290185 A1* | 11/2012 | Cooper | B61L 27/16 |
| | | | 701/93 |
| 2015/0221225 A1* | 8/2015 | Petersen | G06Q 10/04 |
| | | | 701/120 |
| 2016/0321925 A1 | 11/2016 | Al Suwaidi | |
| 2016/0343068 A1* | 11/2016 | Barrois | G06Q 30/0645 |
| 2018/0108103 A1* | 4/2018 | Li | G08G 1/202 |
| 2018/0136655 A1 | 5/2018 | Kim et al. | |
| 2018/0222340 A1 | 8/2018 | Zhao et al. | |
| 2018/0357912 A1* | 12/2018 | Kessler | G06Q 10/08 |
| 2018/0366004 A1* | 12/2018 | Laetz | G06Q 10/02 |
| 2019/0108468 A1* | 4/2019 | Nguyen | G01C 21/3438 |
| 2019/0137290 A1 | 5/2019 | Levy et al. | |
| 2020/0098261 A1* | 3/2020 | O'Sullivan | G06Q 10/02 |
| 2020/0217677 A1* | 7/2020 | Wang | G01C 21/3461 |
| 2020/0226498 A1* | 7/2020 | Jiwani | G06Q 10/02 |
| 2020/0410375 A1* | 12/2020 | Seagraves | G06N 5/04 |
| 2021/0166164 A1 | 6/2021 | Proctor et al. | |
| 2021/0224943 A1* | 7/2021 | Yanai | G06Q 10/06314 |
| 2021/0380022 A1 | 12/2021 | Kanitz | |
| 2022/0113149 A1* | 4/2022 | Ji | G01C 21/3605 |
| 2022/0114505 A1* | 4/2022 | Ji | G06Q 10/02 |
| 2022/0364866 A1* | 11/2022 | Williams | H04W 4/44 |

OTHER PUBLICATIONS

Translation of CN-111639854-B, 20 pages (Year: 2023).*
"Hyundai Motor Presents Smart Mobility Solution 'UAM-PBV-Hub' to Vitalize Future Cities", *Hyundai Motor Company*, issued on Jan. 7, 2020, (5 pages in English).
Extended European search report issued on Feb. 10, 2022, in counterpart European Patent Application No. 21196469.7 (8 pages in English).
United States Office Action Issued on Dec. 30, 2022, in related U.S. Appl. No. 17/468,212 (36 Pages in English).
United States Office Action issued on May 12, 2023, in related U.S. Appl. No. 17/474,512 (24 pages in English).
U.S. Office Action issued on Nov. 21, 2023, in related U.S. Appl. No. 17/474,512 (32 pages).

* cited by examiner

TRANSPORTATION SYSTEM AND OPERATION METHOD THEREOF

CROSS-REFERENCE TO RELATED APPLICATION

This application claims the benefit of Korean Patent Application No. 10-2020-0130250, filed on Oct. 8, 2020 with the Korean Intellectual Property Office, the disclosure of which is herein incorporated by reference in its entirety.

BACKGROUND OF THE INVENTION

1. Field of the Invention

The present invention relates to a transportation system configured such that a plurality of hubs is provided in corresponding areas and transportation means are parked in connection slots or landing pads provided at each hub and such that a server determines the number or type of transportation means to be allocated to each hub based on data about population movement between the areas and allocates the transportation means to each hub and an operation method thereof.

2. Description of the Related Art

Conventionally, movement between areas is performed through vehicles, trains, airplanes, and ships at a terminal, a railroad station, an airport, and a port. At a terminal, a railroad station, an airport, and a port located in each area, vehicles, trains, airplanes, and ships are allocated at predetermined intervals, and passengers board the vehicles, trains, airplanes, and ships on departure time.

In the case in which a passenger is late for departure, the passenger must wait for the next departure time. In the case in which the passenger moves to a destination while transferring from a vehicle, a train, an airplane, or a ship to another vehicle, another train, another airplane, or another ship, the passenger must move to a terminal, a railroad station, an airport, or a port at which a transportation means for transfer is located. In the case in which the number of passengers who wish to move to a specific area at a specific time abruptly increases, some passengers cannot move to the specific area at the specific time due to more than the fixed number for a vehicle, a train, an airplane, or a ship departed at the time.

Therefore, there is a need for a system capable of allowing easy transfer between transportation means, collecting data about movement between areas to predict and departure transportation means to be moved by area, whereby it is possible to maximally satisfy demand for passengers who wish to move, thereby solving the above problems.

The matters disclosed in this section are merely for enhancement of understanding of the general background of the invention and should not be taken as an acknowledgment or any form of suggestion that the matters form the related art already known to a person skilled in the art.

SUMMARY OF THE INVENTION

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a transportation system includes a plurality of hubs, each of the hubs corresponding to an area and including a plurality of connection slots or one or more landing pads, each of the connection slots and the landing pads being configured to accommodate a transportation unit; and a server configured to determine a number or type of transportations units to be allocated to each of the hubs based on movement data related to population movement between the areas and to allocate each of the transportation units to a respective hub.

The transportation units may include air mobilities or vehicles, the vehicles may be categorized by use, the plurality of connection slots, in which the vehicles are accommodated, may be grouped by category, and the grouped connection slots may be adjacent to each other.

The transportation units may be vehicles, and in a case in which the vehicles are accommodated in the connection slots, each hub may be connected to interior spaces of the respective vehicles through the connection slots.

The movement data may include route data related to a population movement route or quantity data related to a number of floating population, and the server may be configured to generate the route data or the quantity data based on integrated information including climates, issues, health, trends, or events by area.

The route data may be data related to a route along which population moves between the areas by period, and the server may be configured to allocate a larger number of transportation units to a hub located on a route on which population movement is more frequent.

The quantity data may be data related to a number of population moving between the areas by period, and the server may be configured to allocate a larger number of transportation units to a hub located in an area having higher population movement.

In a case in which the integrated information is changed, the server may be configured to modify previously generated movement data based on the changed integrated information and to change the number or type of transportation units to be allocated to the respective hub based on the modified movement data.

The server may be configured to set allocation intervals of the transportation units allocated to the respective hub based on the movement data and to determine the number or type of transportation units to be allocated to the respective hub at the allocation intervals.

The server may be configured to collect passenger information related to a use of the transportation units preferred by a passenger, to match the passenger with the connection slot or the transportation units based on the passenger information, and to guide the passenger to the matched connection slot or transportation units.

The server may be configured to request consent for collection of passenger information upon receiving a request for allocation of the transportation units from a terminal of the passenger, and in a case in which the consent for collection of passenger information is obtained from the terminal of the passenger, the server may be configured to collect the passenger information from the terminal of the passenger.

The passenger information may include retrieval information of the terminal of the passenger, location information, health information, picture information, or purchase information, and the server may be configured to select a use of the transportation units to be matched with the passenger based on the retrieval information of the terminal of the passenger, the location information, the health information, the picture information, or the purchase information.

The server may be configured to set a movement route of the transportation units based on the use of the transportation units matched with the passenger, and to control the transportation units to move along the set movement route after boarding of the passenger.

Articles provided in the plurality of vehicles or air mobilities may be replaced depending on a use or category thereof.

The server may be configured to give an order such that articles to be provided in the vehicles or the air mobilities allocated to the respective hub are delivered to the respective hub.

In another general aspect, an operation method of a transportation system that includes a plurality of hubs, each of the hubs corresponding to an area and including a plurality of connection slots or one or more landing pads, each of the connection slots and the landing pads being configured to accommodate a transportation unit, the operation method including: determining a number or type of transportation units to be allocated to each of the hubs based on movement data related to population movement between each of the areas; and allocating the transportation units to a respective hub.

The operation method may include generating movement data based on integrated information including climates, issues, health, trends, or events by area before the determining the number or type of transportation units.

The operation method may include, in a case in which the integrated information is changed, modifying previously generated movement data based on the changed integrated information and changing the number or type of transportation units to be allocated to the respective hub based on the modified movement data after the allocating the transportation units to the respective hub.

Other features and aspects will be apparent from the following detailed description, the drawings, and the claims.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
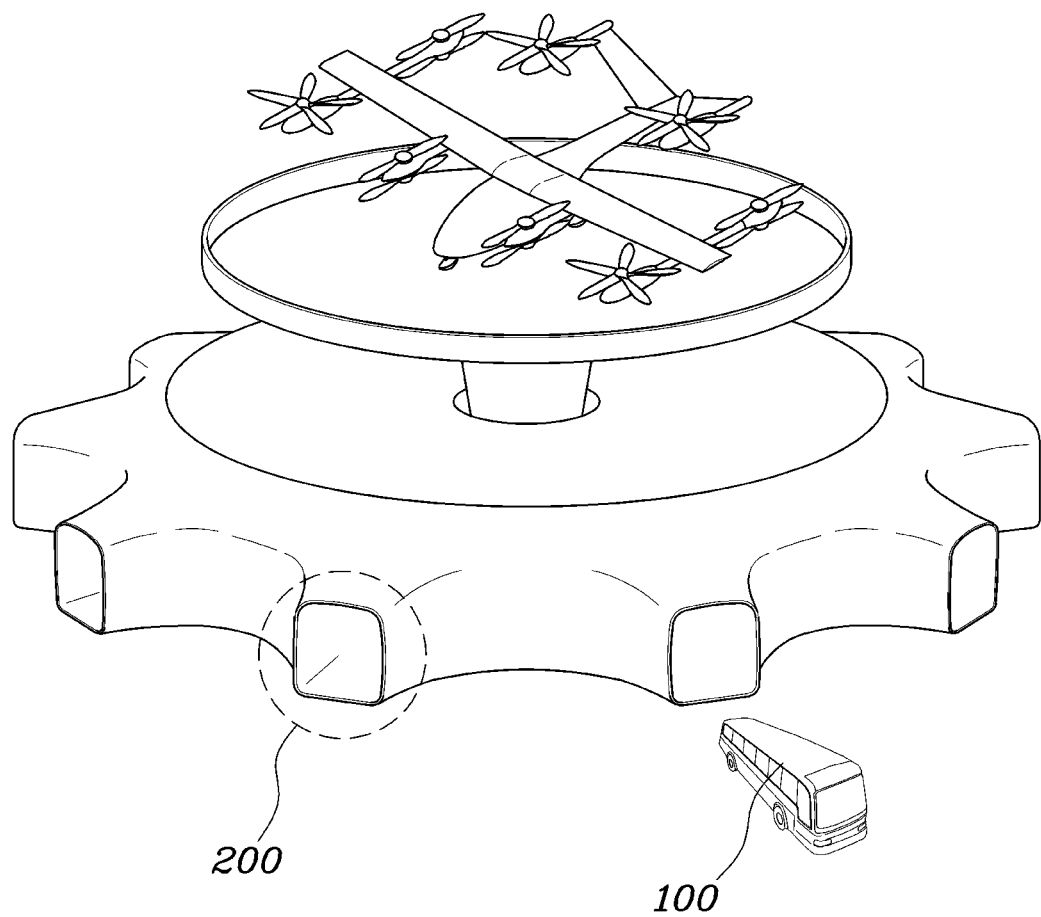
FIG. 1 is a view showing vehicles and connection slots in a hub of a transportation system according to an embodiment of the present invention.
Figure 2:
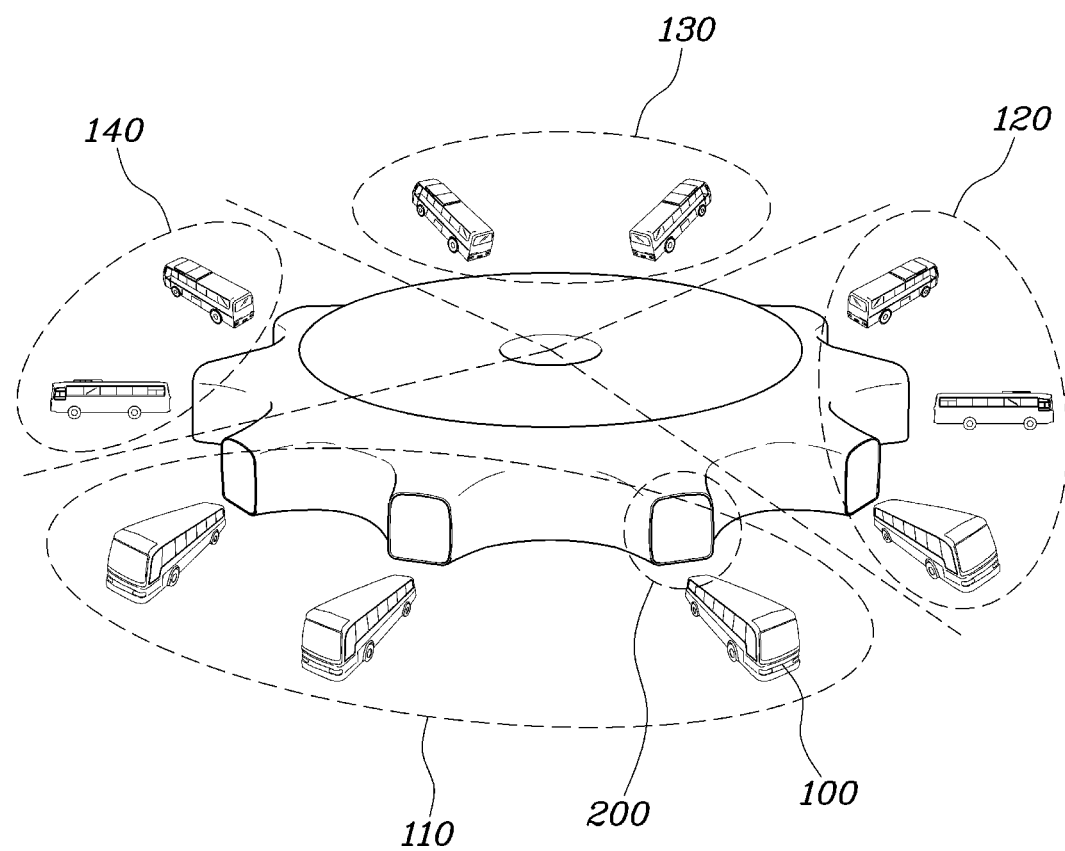
FIG. 2 is a view showing that a plurality of vehicles is categorized into grouped connection slots by use in the hub of the transportation system according to the embodiment of the present invention.
Figure 3:
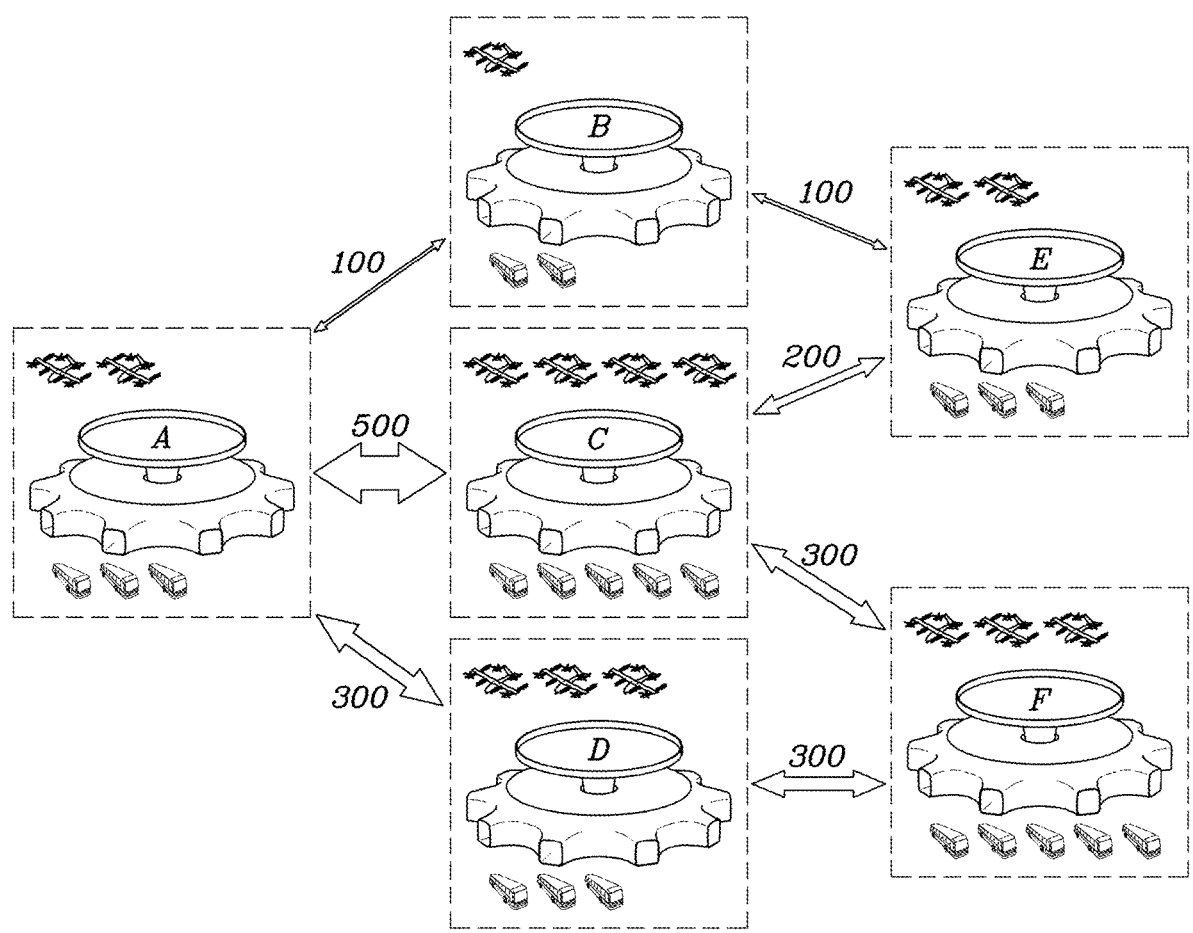
FIG. 3 is a view showing that transportation means are allocated to a hub located in each area based on movement data in the transportation system according to the embodiment of the present invention.
Figure 4:
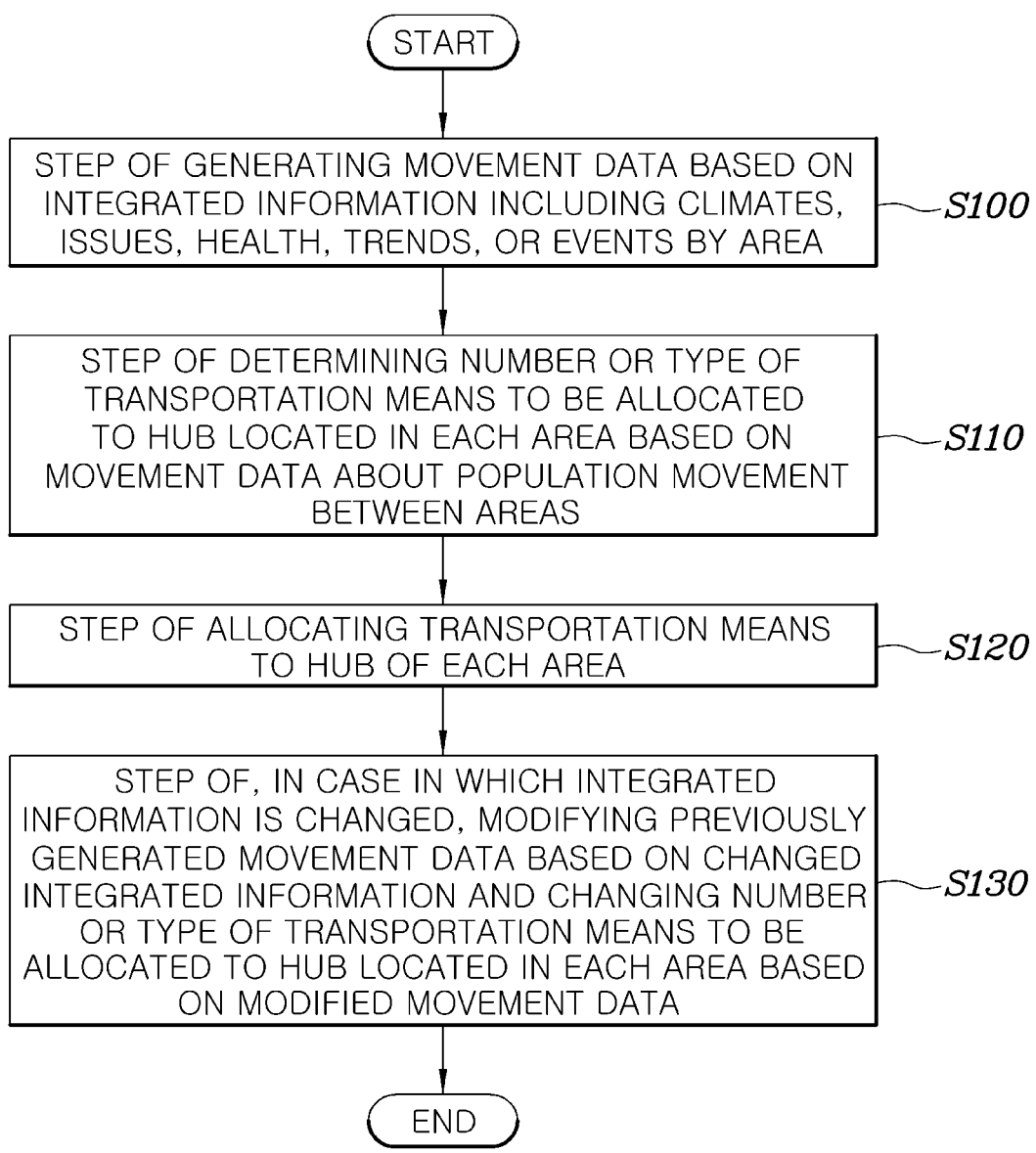
FIG. 4 is a flowchart showing an operation method of the transportation system according to the embodiment of the present invention.

FIG. 1 is a view showing vehicles and connection slots in a hub of a transportation system according to an embodiment of the present invention. FIG. 2 is a view showing that a plurality of vehicles is categorized into grouped connection slots by use in the hub of the transportation system according to the embodiment of the present invention. FIG. 3 is a view showing that transportation means are allocated to a hub located in each area based on movement data in the transportation system according to the embodiment of the present invention. FIG. 4 is a flowchart showing an operation method of the transportation system according to the embodiment of the present invention.

FIG. 1 is a view showing vehicles and connection slots in a hub of a transportation system according to an embodiment of the present invention. FIG. 2 is a view showing that a plurality of vehicles is categorized into grouped connection slots by use in the hub of the transportation system according to the embodiment of the present invention. The transportation system according to the embodiment of the present invention includes a plurality of hubs, each of the hubs being located at a corresponding area, each of the hubs being provided with a plurality of connection slots 200 or one or more landing pads, transportation means being parked in the connection slots 200 or the landing pads, and a server configured to determine the number or type of transportation means to be allocated to a hub located in each area based on movement data about population movement between areas and to allocate the transportation means to each hub.

Also, in the transportation system according to the embodiment of the present invention, the transportation means may be air mobilities or vehicles 100, the vehicles 100 may be categorized by use, the plurality of connection slots 200, in which the vehicles 100 are parked, may be grouped by category, and each of the connection slots 200 in the grouped connection slots 110, 120, 130 and 140 may be disposed adjacent to each other. The one or more landing pads may be provided above the plurality of connection slots 200, and air mobilities may be landed on the landing pads. In the case in which a plurality of landing pads is provided, a plurality of air mobilities may be simultaneously landed. The plurality of air mobilities may be categorized by use, a plurality of landing pads, on which the air mobilities are parked, may be grouped by category, and the grouped landing pads may be disposed adjacent to each other. In the transportation system according to the embodiment of the present invention, the transportation means may be vehicles. In the case in which vehicles are parked in the connection slots, the hub may be connected to interior spaces of the vehicles through the connection slots.

In the case in which autonomous driving is commercialized from now on, passengers may not directly drive the vehicles 100 or the air mobilities, and may perform various activities in the vehicles 100 or the air mobilities for specific purposes while the vehicles 100 or the air mobilities move to predetermined destinations. In order for the passengers to perform various activities in the vehicles 100 or the air mobilities for specific purposes, therefore, the hub may perform control such that the vehicles 100 or the air mobilities are provided with articles necessary for various activities and such that the vehicles 100 or the air mobilities are disposed in the connection slots 200 or the landing pads in the hub depending on demand or preference of the passengers. The hub is a complex terminal. The passengers may board the vehicles 100 or the air mobilities in the hub, or may also use the hub as transfer passages. In the case in which connection slots 200 or landing pads grouped by category are disposed adjacent to each other, therefore, passengers belonging to the same categories may more easily and rapidly move to and board the vehicles.

FIG. 3 is a view showing that transportation means are allocated to a hub located in each area based on movement data in the transportation system according to the embodiment of the present invention. In the transportation system according to the embodiment of the present invention, the movement data may include route data about a population movement route or quantity data about the number of floating population, and the server may generate the route data or the quantity data based on integrated information including climates, issues, health, trends, or events by area. For example, the server may predict population movement based on climate information, such as weather, seasons, abnormal climates (heavy rain and heat wave), and typhoons, by period or area to generate route data or quantity data, or may predict population movement based on issue information, such as social, economic, cultural, and political issues, to generate route data or quantity data.

In addition, the server may predict population movement based on health information, such as diseases, contagious diseases, and personal hygiene management, trend information, such as broadcasting, travel, and culture, or event information, such as local events, traditional events, film festivals, cultural events, and seasonal events, to generate route data or quantity data. In order to predict the population movement route and the number of floating population by day, week, month, and quarter, the server predicts the population movement route and the number of floating population using a big data analysis-based technique (AI) based on integrated information to allocate vehicles or air mobilities to each local hub.

Specifically, in the transportation system according to the embodiment of the present invention, route data are data about a route along which population moves between areas by period, and the server may allocate a larger number of transportation means to a hub located on a route on which population movement is more frequent. For example, referring to FIG. 3, in the case in which population moves from hub A to hub E or hub F, the frequency of population movement in hub C is higher, since hub C becomes a movement route of hub A, hub E, and hub F, unlike hub B or hub E. Consequently, for an area becoming a transit point for population movement, like an area in which hub C is located, much more demand for movement than other areas is predicted, and therefore the server allocate a larger number of vehicles or air mobilities to a hub located at a transit area, like hub C. The numbers 100, 200, 300 and 500 of FIG. 3 represent a number of population or persons moving between the different hubs.

Also, in the transportation system according to the embodiment of the present invention, quantity data are data about the number of population moving between areas by period, and the server may allocate a larger number of transportation means to a hub located at an area having higher population movement. For example, referring to FIG. 3, when comparing the number of population moving between hub A and hub B and the number of population moving between hub A and hub D with each other, the number of population moving between hub A and hub D is greater than the number of population moving between hub A and hub B, and therefore demand for movement at an area at which hub D is located is higher than demand for movement at an area at which hub B is located. Consequently, the server allocates a larger number of vehicles or air mobilities to hub D.

Eventually, the server predicts population movement means and demand by day, week, month, and quarter based on the route data and quantity data to allocate vehicles or air mobilities to a hub located in each area.

Meanwhile, in the transportation system according to the embodiment of the present invention, in the case in which the integrated information is changed, the server may modify previously generated movement data based on the changed integrated information and may change the number or type of transportation means to be allocated to the hub located in each area based on the modified movement data. In order to sense change of the integrated information, the server collects information about climates, issues, health, trends, or events by date or area at predetermined intervals, analyzes the boarding rate and error of vehicles or air mobilities allocated based on the predicted demand for movement in each area to update population movement means and demand predicted by area or by day, week, month, and quarter, and change the number or type of vehicles or air mobilities disposed in the hub of each area based on the result of update in order to allocate vehicles or air mobilities again.

Also, in the transportation system according to the embodiment of the present invention, the server may set allocation intervals of the transportation means allocated to the hub located in each area based on the movement data, and may determine the number or type of transportation means to be allocated to the hub at the allocation intervals. The server allocates a larger number of vehicles or air mobilities at an area at which population movement is intensive or at a time at which population movement is intensive, whereby it is possible to minimize waiting time of passengers who wish to move and to enable the passengers to rapidly move to desired areas.

Meanwhile, in the transportation system according to the embodiment of the present invention, the server may collect passenger information related to the use of transportation means preferred by passengers, may match the passengers with the connection slots or the transportation means based on the passenger information, and may guide the passengers to the matched connection slots or transportation means. Upon receiving a request for a necessary transportation means from a passenger, the server allows the passenger to select whether the transportation means is a vehicle 100 or an air mobility and whether the purpose of movement is simple movement, movement for business, or urgent movement. Subsequently, the passenger directly selects the use of the vehicle 100 provided in the hub, or the server may analyze the tendency or preference of the passenger to select the use of the vehicle. The server may park the vehicle 100 in the connection slots 200 grouped by category, and may guide the passenger to the matched vehicle 100 or connection slot 200. The passenger may board the provided vehicle 100 to move to a destination. During movement, the passenger may perform various activities by use in the vehicle.

Also, in the transportation system according to the embodiment of the present invention, the server may request consent for collection of passenger information upon receiving a request for allocation of a transportation means from a terminal of the passenger. In the case in which the consent for collection of passenger information is obtained, the server may collect the passenger information from the terminal of the passenger. In the transportation system according to the embodiment of the present invention, the passenger information may include retrieval information of the terminal of the passenger, location information, health information, picture information, or purchase information, and the server may select the use of a transportation means to be matched with the passenger based on the retrieval information of the terminal of the passenger, the location information, the health information, the picture information, or the purchase information.

Specifically, in the case in which the passenger consents to provision of personal information, the server collects retrieval, picture, or location information of an electronic device, such as a personal mobile phone or a desktop computer, receives health information of the passenger, or collects reservation information, such as public performances, movies, personal articles, hotels, resorts, and lodging. The server analyzes or classifies the tendency or preference of the passenger using a big data analysis-based technique (AI) based on the passenger information in order to sort hub zones or to select the use or purpose of the vehicle 100 or the air mobility.

Meanwhile, in the transportation system according to the embodiment of the present invention, the server may set a movement route of the transportation means based on the use of the transportation means matched with the passenger, and may perform control such that the transportation means moves along the set movement route after boarding of the passenger. For example, in the case in which the passenger must urgently move, the transportation means must move via a specific place, or a time for the passenger to perform various activities in the vehicle 100 or the air mobility based on the purpose or use of the vehicle 100 or the air mobility is necessary, the server may calculate a necessary time, may set the movement route of the vehicle 100 or the air mobility based thereon, and may perform control such that the vehicle 100 or the air mobility moves along the set movement route.

Also, in the transportation system according to the embodiment of the present invention, articles provided in a plurality of vehicles 100 or air mobilities may be replaced depending on the use or category thereof. In the transportation system according to the embodiment of the present invention, the server may give an order such that articles to be provided in vehicles 100 or air mobilities allocated to the hub of each area are delivered to the hub of the area. Demand for the vehicles 100 or the air mobilities disposed in the hub is changed depending on the use or category based on tendency or preference of passengers. When there is a request for boarding of passengers, the hub predicts demand for vehicles 100 or air mobilities belonging to the use or category based on tendency or preference of passengers, and performs control such that the vehicles 100 or the air mobilities wait in the connection slots 200 or on the landing pads. In the case in which demand is higher or lower than predicted, articles provided in each vehicle 100 or each air mobility are replaced, whereby the use or category of the vehicles 100 is changed, and therefore the demands of passengers are satisfied. As a result, during movement after the passenger boards the vehicle 100 or the air mobility, the passenger may perform various activities using the articles provided in the vehicle 100 or the air mobility. In the case in which there is a category having high demand, the server may give an order such that new articles are delivered to the hub, whereby it is possible to improve convenience in use of the passengers and maintenance of the vehicles 100 or the air mobilities.

FIG. 4 is a flowchart showing an operation method of the transportation system according to the embodiment of the present invention. The operation method of the transportation system according to the embodiment of the present invention includes a step (S110) of determining the number or type of transportation means to be allocated to a hub located in each area based on movement data about population movement between areas and a step (S120) of allocating the transportation means to the hub of each area.

The operation method of the transportation system according to the embodiment of the present invention may further include a step (S100) of generating movement data based on integrated information including climates, issues, health, trends, or events by area before the step (S110) of determining the number or type of transportation means.

The operation method of the transportation system according to the embodiment of the present invention may further include a step (S130) of, in the case in which the integrated information is changed, modifying previously generated movement data based on the changed integrated information and changing the number or type of transportation means to be allocated to the hub located in each area based on the modified movement data after the step (S120) of allocating the transportation means to the hub of each area.

In the case in which the transportation system according to the embodiment of the present invention is used, the server may predict demand for population movement between areas and allocates vehicles or air mobilities to a hub of each area based on the predicted demand, whereby it is possible for passengers to easily and rapidly move between the areas. In the case in which the predicted demand is changed, this may be immediately updated such that the number or type of vehicles or air mobilities allocated to the hub of each area is changed, whereby it is possible for the passengers to move between the areas without inconvenience.

As is apparent from the above description, in a transportation system according to the present invention and an operation method thereof, a plurality of hubs is provided in corresponding areas, vehicles and air mobilities are parked in connection slots and on landing pads provided at each hub, whereby transfer between the vehicles and the air mobilities is easily achieved. In addition, the number or type of transportation means to be allocated to each hub is determined based on data about population movement between the areas, and the transportation means are allocated to each hub based thereon, whereby smooth population movement between the areas is achieved.

Although the preferred embodiments of the present invention have been described above with reference to the accompanying drawings, those skilled in the art will appreciate that the present invention can be implemented in various other embodiments without changing the technical ideas or features thereof.

What is claimed is:

1. A transportation system comprising:
 a plurality of hubs, each of the hubs comprising at least one of a plurality of connection slots, each of the connection slots configured to receive one of a plurality of vehicles; and
 a server configured to:
  generate movement data related to population movement between geographic areas, wherein the movement data includes route data related to a population movement route and quantity data related to a number of floating population, wherein the route data and quantity data are also based on integrated information including at least one of climate data, health data, and event data by area, wherein the quantity data relates to a number of people moving between areas during a time period;
  determine a number and type of vehicles to be allocated to each of the hubs based on the generated movement data, wherein the server predicts population movement based on the integrated information; and automatically dispose each of the vehicles to a respective hub according to the determination of the number and type of vehicles to be allocated to each of the hubs, wherein when the integrated information is changed, the server is configured to modify previously generated movement data based on the changed integrated information and to change at least one of the number or type of vehicles to be allocated to the respective hub based on the modified data, and wherein the server is further configured to generate the changed integrated information based on an analysis of a boarding rate and an error in at least one of the number of or type of the vehicles allocated by predicting demand for movement in each area and an update of population movement demands and the demand is predicted for the area or for a period of time.

2. The transportation system according to claim 1, wherein the vehicles include air mobilities or land vehicles, and grouped connection slots are adjacent to each other.

3. The transportation system according to claim 2, wherein articles provided in the land vehicles or the air mobilities are replaced depending on a use or category thereof.

4. The transportation system according to claim 3, wherein the server is further configured to give an order such that articles to be provided in the land vehicles or the air mobilities allocated to the respective hub are delivered to the respective hub.

5. The transportation system according to claim 1, wherein the vehicles are land-based vehicles, and wherein, in a case the vehicles are accommodated in the connection slots, each hub is connected to interior spaces of the respective vehicles through the connection slots.

6. The transportation system according to claim 1, wherein the route data are data related to a route along which population moves between the geographic areas by period of time, and wherein the server is further configured to allocate a larger number of vehicles to a hub located on a route on which population movement is more frequent.

7. The transportation system according to claim 1, wherein the quantity data are data related to a number of population moving between the geographic areas by period of time, and wherein the server is further configured to allocate a larger number of vehicles to a hub located in a higher population movement area.

8. The transportation system according to claim 1, wherein the server is further configured to:

set allocation intervals of the vehicles allocated to the respective hub based on the movement data; and determine at least one of the number or type of vehicles to be allocated to the respective hub at the allocation intervals.

9. The transportation system according to claim 1, wherein the server is further configured to:

collect passenger information related to a use of the vehicles preferred by a passenger;

match the passenger with the connection slot or the vehicles based on the passenger information; and guide the passenger to the matched connection slot or vehicles.

10. The transportation system according to claim 9, wherein the server is further configured to:

request consent for collection of passenger information upon receiving a request for allocation of the vehicles from a terminal of the passenger; and in case the consent for collection of passenger information is obtained from the terminal of the passenger, collect the passenger information from the terminal of the passenger.

11. The transportation system according to claim 10, wherein the passenger information comprises retrieval information of the terminal of at least one of the passenger, location information, health information, picture information, or purchase information, and wherein the server is further configured to select a use of the vehicles to be matched with the passenger based on the retrieval information of the terminal of the passenger, the location information, the health information, the picture information, or the purchase information.

12. The transportation system according to claim 9, wherein the server is further configured to:

set a movement route of the vehicles based on the use of the vehicles matched with the passenger; and control the vehicles to move along the set movement route after boarding of the passenger.

13. The transportation system according to claim 1, wherein the server is further configured to:

receive a request for a particular transportation unit from a passenger;

identify a purpose of the request based on a type of movement requested by the passenger;

determine a necessary time; and set a movement route of transportation based on the necessary time.

14. An operation method of a transportation system that includes a plurality of hubs, each of the hubs including at least one of a plurality of connection slots or one or more landing pads or any combination thereof, each of the connection slots and the landing pads for accommodating one of a plurality of vehicles, the operation method comprising:

generating movement data related to population movement between geographic areas, wherein the movement data includes route data related to a population movement route and quantity data related to a number of floating population, wherein the route data and quantity data are also based on integrated information including at least one of climate data, health data, and event data by area, wherein the quantity data relates to a number of people moving between areas during a time period;

determining a number and type of vehicle to be allocated to each of the hubs based on the generated movement data wherein population movement is predicted based on the integrated information; and automatically disposing the vehicles to a respective hub according to the determination of the number and type of vehicles to be allocated to each of the hubs, wherein when the integrated information is changed, the server is configured to modify previously generated movement data based on the changed integrated information and to change at least of the number or type of vehicles to be allocated to the respective hub based on the modified data, and wherein the server is further configured to generate the changed integrated information based on an analysis of a boarding rate and an error in at least one of the number or type of the vehicles allocated by predicting demand for movement in each area and an update of population movement demands and the demand is predicted for the area or for a period of time.

15. The operation method according to claim 14, further comprising:
   in case the integrated information is changed, modifying previously generated movement data based on the changed integrated information; and
   changing at least one of the number or type of vehicles to be allocated to the respective hub based on the modified movement data after the allocating of the vehicles to the respective hub.

* * * * *